United States Patent [19]

Fuzesi et al.

[11] Patent Number: 4,490,518

[45] Date of Patent: Dec. 25, 1984

[54] LIQUID ORGANIC POLYISOCYANATE-DICARBOXYLIC ESTER BINDER COMPOSITION AND LIGNOCELLULOSIC COMPOSITE MATERIALS PREPARED THEREFROM

[75] Inventors: Stephen Fuzesi; Robert W. Brown, both of Hamden, Conn.

[73] Assignee: Olin Corporation, Cheshire, Conn.

[21] Appl. No.: 538,712

[22] Filed: Oct. 3, 1983

[51] Int. Cl.³ .................. C08G 18/14; C08G 18/36
[52] U.S. Cl. ..................... 527/401; 527/100; 527/103; 524/13; 524/14; 528/1; 156/331.4; 428/245; 264/125
[58] Field of Search .............. 524/13, 14; 527/100, 527/103, 401; 528/1, 66; 156/331.4; 428/243, 245, 541; 264/125

[56] References Cited

U.S. PATENT DOCUMENTS

| | | | |
|---|---|---|---|
| 4,201,847 | 5/1980 | Kleimann et al. | 521/132 |
| 4,254,228 | 3/1981 | Kleimann et al. | 521/172 |
| 4,279,788 | 7/1981 | Lambuth | 156/331.4 |
| 4,376,088 | 3/1983 | Prather | 264/109 |
| 4,376,089 | 3/1983 | Bogner et al. | 264/109 |
| 4,376,144 | 3/1983 | Goettler | 524/35 |
| 4,414,361 | 11/1983 | Gaul et al. | 527/103 |

Primary Examiner—John Kight
Assistant Examiner—Nathan M. Nutter
Attorney, Agent, or Firm—William D. Sabo

[57] ABSTRACT

Disclosed is a liquid binder composition containing from about 40 to about 98 percent by weight of an organic polyisocyanate and correspondingly from about 2 to about 60 percent by weight of a select ester derived from a dicarboxylic acid. When the binder composition is used in making lignocellulosic composite materials, such as particle board, the ester acts as an effective internal mold release agent, facilitating release of the composite material from the mold.

31 Claims, No Drawings

LIQUID ORGANIC POLYISOCYANATE-DICARBOXYLIC ESTER BINDER COMPOSITION AND LIGNOCELLULOSIC COMPOSITE MATERIALS PREPARED THEREFROM

This invention relates to a binder composition and, more particularly, to a liquid organic polyisocyanate-ester binder composition, its use in preparing lignocellulosic composite materials and the composite materials so produced.

It is known in the art to use an organic polyisocyanate, as a binder, or as a component of a binder, in the manufacture of lignocellulosic composite materials, such as particle board, chip board, wafer board, plywood, and so forth. See, for example, U.S. Pat. Nos. 3,428,592; 3,440,189; 3,919,017; and 4,260,532. Typically, the organic polyisocyanate-based binder, which optionally can be in the form of an aqueous emulsion or a solution, is applied to a plurality of lignocellulosic particles. The treated particles are then formed into a mat and subjected to elevated temperature and pressure between heated platens for a predetermined period of time. The resulting composite materials generally demonstrate excellent internal bonding properties due to the strong adhesive characteristics of the organic polyisocyanates.

A serious problem has been encountered, however, in the use of organic polyisocyanate-based binders in the production of lignocellulosic composite materials. Because of the exceptional binding power of the organic polyisocyanates, the composite materials so produced tend to adhere to the mold surfaces during the molding process. As a result, the product can be severely damaged, and considerable effort and expense can be incurred in removing product from the mold surfaces. These deleterious consequences have prevented the use of polyisocyanate-based binders from becoming widespread in the industry.

In an effort to overcome this problem, various additives have been incorporated into organic polyisocyanate-based binders to serve as internal mold release agents. For example, in U.S. Pat. No. 4,257,995, mono- or di-acid phosphates or pyrophosphates are added to reduce the adherence problem. Other additives include phosphates or thiophosphates (U.S. Pat. No. 4,257,996), phosphinic or phosphoric acids or phosphites (U.S. Pat. No. 4,352,696), organic sulfonic acids or hydrogen sulfates (U.S. Pat. No. 4,376,088) and mixtures of furfural and phosphates (U.S. Pat. No. 4,376,089).

Another approach involves applying various compounds to the mold surfaces to facilitate release. For example, in U.S. Pat. No. 4,110,397, a "metallic soap" is employed. In U.S. Pat. No. 4,374,791, the metallic surfaces of the mold are precoated with a layer of polytetrafluoroethylene.

For a variety of reasons, none of these techniques has proven to be entirely satisfactory and there is a need in the art for an improved organic polyisocyanate-based binder composition which serves to minimize the adherence problem.

Now, according to the invention, it has been discovered that the foregoing problem can be minimized by using an organic polyisocyanate-based binder composition which incorporates a select ester. In the practice of the invention, a lignocellulosic composite material is produced which features a minimal tendency to adhere to the hot metal surfaces of the mold. As an additional feature, the addition of the select ester reduces the overall viscosity of the binder composition, thus allowing use of the binder composition by employing conventional appplication technology developed for thermosetting resin binders, such as phenol-formaldehyde. As a further advantage, the ester functions in the binder composition as an inert solvent, and as such does not cause a diminution in the binding properties of the organic polyisocyanate. In addition, the present invention provides a binder composition which is storage stable for a prolonged period of time and which has been found to be of relatively high environmental acceptability. When the binder composition is employed in the production of lignocellulosic composite materials, it has also been found that the ester tends to soften the lignocellulosic particles, rendering the particles easier to press.

The binder composition employed according to the present invention is prepared by mixing an organic polyisocyanate and a select ester. In forming the mixture, from about 40 to about 98 percent by weight of the organic polyisocyanate and correspondingly from about 2 to about 60 percent by weight of the ester are employed. Preferably, the mixture includes from about 70 to about 97 percent by weight of the organic polyisocyanate and correspondingly from about 3 to about 30 percent by weight of the ester.

In forming the binder composition of the invention, any suitable organic polyisocyanate may be used including toluene diisocyanate, such as the 80:20 and the 65:35 mixtures of the 2,4- and 2,6-isomeric forms, ethylene diisocyanate, propylene diisocyanate, methylene-bis (4-phenyl isocyanate), methylene-bis (4-cyclohexyl) isocyanate, xylene diisocyanate, 3,3'-bitoluene-4,4'-diisocyanate, hexamethylene diisocyanate, naphthalene 1,5-diisocyanate, isophorone diisocyanate, the polymeric isocyanates such as polyphenylene polymethylene isocyanate, and the like, and mixtures thereof. Preferably, there is employed an isomeric mixture of 2,4- and 2,6-toluene diisocyanate in which the weight ratio of the 2,4-isomer to the 2,6-isomer is from about 60:40 to about 90:10, and more preferably, from about 65:35 to about 80:20, or polyphenylene polymethylene isocyanate, or a mixture thereof.

Crude or unrefined polyisocyanates also may be used. In accordance with a particularly preferred embodiment of the invention, the crude product of reacting toluene diamine with phosgene, i.e. crude toluene diisocyanate, is employed. As used in the specification and claims herein, the term "crude product of the phosgenation of toluene diamine" is intended to encompass any crude product of reacting toluene diamine with phosgene, which product has an NCO content from about 30 to about 45 percent by weight and is substantially free of solvent and hydrogen chloride by-product. Such a product can be prepared by conventional methods that are well known in the art. See, for example, U.S. Pat. No. 3,522,285, the entire disclosure of which is incorporated by reference herein. Thus, for instance, the undistilled product of the phosgenation of toluene diamine may be prepared by a process comprising the following steps:

a. mixing toluene diamine, such as the 80:20 isomer mixture of 2,4-/2,6-toluene diamine, with an inert organic diluent, such as monochlorobenzene, and a stoichiometric excess of phosgene;

b. heating the mixture to a temperature of about 100°–200° C. which is sufficient to bring about phosgenation of toluene diamine to the corresponding diisocyanate;

c. removing substantially all of the diluent, the unreacted phosgene and the hydrogen chloride by-product, such as by conventional distillation, preferably at subatmospheric pressure;

d. optionally distilling a portion of the toluene diisocyanate from the degassed and solvent free phosgenation product so as to obtain a residual distilland in the form of a crude polyisocyanate composition having an NCO content of at least about 30 percent by weight; and e. if any precipitated or suspended solids are present in the phosgenation product, removing these, such as by filtration.

Preferably, the crude product of the phosgenation of toluene diamine has an NCO content of about 32–43 percent, and more preferably about 34–41 percent, by weight.

The ester which is used to form the binder composition of the invention is derived from a dicarboxylic acid. Suitable esters include the following and mixtures thereof: (a) saturated aliphatic dicarboxylic esters having the formula

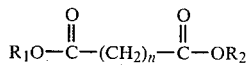

wherein $R_1$ and $R_2$ are independently selected from the group consisting of $C_1$–$C_{20}$ alkyl, $C_1$–$C_{20}$ haloalkyl and $C_1$–$C_{20}$ alkoxy and n is an integer ranging from 1–12, inclusive; (b) unsaturated aliphatic dicarboxylic esters having the formula

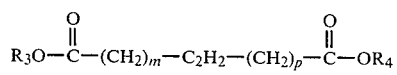

wherein $R_3$ and $R_4$ are independently selected from the group consisting of $C_1$–$C_{20}$ alkyl, $C_1$–$C_{20}$ haloalkyl and $C_1$–$C_{20}$ alkoxy and m and p are the same and each is an integer ranging from 1–10, inclusive; and (c) aromatic dicarboxylic esters having the formula

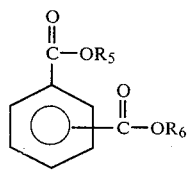

wherein $R_5$ and $R_6$ are independently selected from the group consisting of $C_1$–$C_{10}$ alkyl, $C_1$–$C_{10}$ haloalkyl and $C_1$–$C_{10}$ alkoxy and wherein the aromatic ring is otherwise unsubstituted or substituted with at least one member selected from the group consisting of halo and $C_1$–$C_4$ alkyl.

Preferred esters in each group listed above include the following and mixtures thereof: (a) saturated aliphatic dicarboxylic esters, wherein $R_1$ and $R_2$ are independently selected from the group consisting of $C_1$–$C_8$ alkyl, $C_1$–$C_8$ haloalkyl and $C_1$–$C_8$ alkoxy and n is an integer ranging from 1–8, inclusive; (b) unsaturated aliphatic dicarboxylic esters, wherein $R_3$ and $R_4$ are independently selected from the group consisting of $C_1$–$C_8$ alkyl, $C_1$–$C_8$ haloalkyl and $C_1$–$C_8$ alkoxy and m and p are the same and each is an integer ranging from 1–3, inclusive; and (c) aromatic dicarboxylic esters, wherein $R_5$ and $R_6$ are independently selected from the group consisting of $C_1$–$C_4$ alkyl, $C_1$–$C_4$ haloalkyl and $C_1$–$C_4$ alkoxy and wherein the aromatic ring is otherwise unsubstituted.

Particularly preferred esters are those derived from the following dicarboxylic acids: oxalic, malonic, succinic, glutaric, adipic, pimelic, suberic, azelaic, sebacic, maleic, fumaric, phthalic, isophthalic and terephthalic. The most preferred embodiments of the invention employ esters derived from dicarboxylic acids selected from the group consisting of succinic, glutaric and adipic.

The esters which are employed in forming the binder composition of the invention can be readily prepared by procedures well known in the art. For example, the corresponding dicarboxylic acid can be reacted with the appropriate alcohols or phenols. See Morrison, T. M. and Boyd, R. N., Organic Chemistry (3rd Edition), page 673 (1973). Illustratively, oxalic acid can be reacted with two moles of methanol to form dimethyl oxalate. Various esters such as diethyl phthalate and dibutyl maleate are commercially available. In one particularly preferred embodiment of the invention, a mixture of dimethyl succinate, dimethyl glutarate and dimethyl adipate, commercially available from E. I. duPont de Nemours & Co. under the designation "DBE", is employed.

The described binder composition is used in the manufacture of lignocellulosic composite materials. The process of the invention is carried out by contacting a plurality of lignocellulosic particles with the described binder composition. The contacted particles are thereafter formed into a composite material by the application of heat and pressure.

Particles of any suitable lignocellulosic material may be employed according to the process of the invention. Illustrative materials containing lignocellulose include: wood chips, wood fibers, planar shavings, sawdust, bark, cork and the like, as well as straw, flax, bagasse, bamboo, dried weeds and grasses, corn stalks, hulls from cereal crops such as rice and oats, sisal, and so forth. The moisture content of the lignocellulosic particles typically ranges from about 2 to about 25 percent, and preferably from about 8 to about 20 percent, by weight.

For purposes of illustration, the binder composition will be used to produce particle board in the description which follows. It is to be understood, however, that the binder composition can be suitably employed in the manufacture of any type of lignocellulosic composite material, such as, for example, chip board, wafer board, fiber board, etc., as will be readily apparent to those skilled in the art.

In the manufacture of particle board, the lignocellulosic particles may be conveniently contacted with the binder composition by spraying the particles with the binder composition while the particles are being blended or agitated in an enclosed blender or like mixing apparatus. Any suitable amount of the binder composition may be employed in making particle board according to the process of the invention. Generally speaking, the binder composition is used in a proportion ranging from about 2 to about 50 percent by weight based on the dry weight of the particles. For most applications, it is preferred to employ from about 3 to about 20 percent by weight of the binder composition. If desired, other standard materials, such as fire retardants, pigments, and the like, may also be added to the particles during the blending step.

The treated particles are blended sufficiently to form a uniform mixture, which is then formed into a loose mat or felt. The mat is subsequently placed in a heated press between caul plates and compressed to the desired extent. The actual pressing conditions, i.e. temperature, pressure and time, may vary over wide ranges and are generally dependent on the desired thickness and density of the board being produced, the size of the particles used and other factors familiar to those skilled in the art. In general, however, temperatures ranging from about 200° to about 450° F. and pressures ranging from about 400 to about 800 psi for a period of about 3 to about 8 minutes are typical.

The above-described process can be carried out batchwise or in a continuous manner, as should be readily apparent to those skilled in the art. Either way, a particle board is produced demonstrating a minimal tendency to adhere to the metal surfaces of the press. It is also within the scope of the invention to apply a release agent to the metal surfaces of the press before a manufacturing run is commenced, if desired. This may aid in insuring that no adherence or negligible adherence of the particle board to the metal surfaces takes place. Any material known to those in the art as being suitable as a release agent may be employed, e.g. iron, calcium or zinc stearate compounds.

The binder composition of the present invention may also be used in conjunction with conventional thermosetting resin binders, such as phenol-formaldehyde, resorcinol-formaldehyde, melamine-formaldehyde, urea-formaldehyde, urea-furfural, and the like. Combinations of this type can be particularly useful in the preparation of certain laminated boards. For example, the binder composition of the present invention may be used in one or more inner layers while the conventional binder is added to the outer layers. Such combinations avoid the problems of adhesion normally encountered with polyisocyanate-based binders, while providing a product having internal strength properties substantially improved over products obtained from the use of conventional resins alone.

Other modifications should be readily apparent to those skilled in the art. For example, to modify properties of the binder composition, such as viscosity, polyhydroxyl compounds of the type known in the art of polyurethane chemistry may be added. Various other additives known to those skilled in the art also may be included. It is also possible to use other ingredients which influence polyurethane formation in combination with the binder composition of the invention. If desired, common urethane catalysts, such as tertiary amines, may be added to promote the chemical reaction between the polyisocyanate and the lignocellulosic material. This may result in shorter press times or lower molding temperatures.

The lignocellulosic composite materials produced in accordance with the invention have excellent physical properties and may be used in any of the customary areas of application for such materials.

The following examples are provided to illustrate the invention. In Examples 1–13, a crude toluene diamine phosgenation product was used which had an NCO content ranging from 33–39.5 percent by weight. This product, referred to in the examples as "crude TDI", was prepared by a conventional method which comprises (a) reacting, at about 125° C., excess phosgene with a 10 percent solution of toluene diamine (mixture of 2,4- and 2,6-isomers) in monochlorobenzene; (b) removing the monochlorobenzene, unreacted phosgene and by-product HCl from the phosgenation product; (c) fractionally distilling this product into an overhead fraction consisting essentially of pure toluene diisocyanate and a bottom crude isocyanate fraction; (d) filtering the bottom fraction to remove solid matter therefrom; and (e) recovering the filtrate for use in the examples which follow.

Unless otherwise specified, all parts and percentages in the examples are by weight. The physical properties were determined in accordance with ASTM D1037.

EXAMPLE 1

104.2 Grams of wood chips 1 were placed in a laboratory rotating drum blender. While rotating the drum, the chips were sprayed with a solution containing 87.5% of crude TDI and 12.5% of an ester composition 2. The resulting mixture was then blended for an additional 10 minutes to achieve uniform wetting of the chips. The coated wood chips were formed into a square mat (8.3" × 8.3") on a square aluminum caul plate (12" × 12"). A second, identical caul plate was then placed over the mat, and the mat/caul plate assembly was then placed between the aluminum platens of a compression molding machine, the platens having been preheated to a temperature of 300° F. The mat was subjected to a molding temperature of 300° F. and a pressure of 700 psi. After 6 minutes, the pressure was released and the particle board was demolded and cut into specimens for physical testing.

1 Commercially available from Wilner Wood Products Co., Norway, Maine, under the designation "PINE DRI", understood as consisting of white pine wood (moisture content: 4.2%, particle size: 8–20 mesh).
2 Commercially available from E. I. duPont de Nemours & Co. under the designation "DBE", understood as consisting of a mixture of dimethyl succinate, dimethyl glutarate and dimethyl adipate.

The particle board was demolded without demonstrably sticking to the caul plates. The physical appearance of the particle board was excellent. The composition and physical properties of the particle board are summarized in Table I below.

EXAMPLES 2–6

The procedure of Example 1 was repeated except with the following changes. In Examples 2 and 3, the wood chips were employed in different proportions and had different moisture contents. In Examples 4–6, a different type of wood chips 1 was used, and in these examples, the wood chips also were employed in varying proportions and containing varying moisture contents.

1 Obtained from Elmendorf Board Corporation, Claremont, N.H., understood as consisting of 70% pine wood and 30% aspen wood (moisture content: 4.2–11% , particle size: strands ranging in length from about ¼"–2½").

The particle boards were demolded without demonstrably sticking to the caul plates. The physical appearance of the particle boards was excellent. The composition and physical properties of the particle boards are summarized in Table I below.

TABLE I

| | Example | | | | | |
|---|---|---|---|---|---|---|
| | 1 | 2 | 3 | 4 | 5 | 6 |
| Wood chips[1], grams | 104.2 | 107.5 | 111.0 | — | — | — |
| Wood chips[2], grams | — | — | — | 104.2 | 107.5 | 111.0 |
| Moisture content, percent | 4.2 | 7.5 | 11.0 | 4.2 | 7.5 | 11.0 |
| Binder composition[3], grams | 8.0 | 8.0 | 8.0 | 8.0 | 8.0 | 8.0 |
| Molding conditions: | | | | | | |
| Temperature, °F. | 300 | 300 | 300 | 300 | 300 | 300 |
| Pressure, psi | 700 | 700 | 700 | 700 | 700 | 700 |
| Time, minutes | 6 | 6 | 6 | 6 | 6 | 6 |
| % Wt. loss-during pressing | 4.6 | 6.89 | 8.23 | 3.44 | 5.22 | 7.26 |
| Physical Properties | | | | | | |
| Thickness, inches | 0.386 | 0.378 | 0.378 | 0.383 | 0.381 | 0.375 |
| Density, pcf | 42.81 | 43.00 | 41.65 | 45.00 | 47.08 | 44.51 |
| % Thickness swell after soaking in water for 24 hours | 16.32 | 16.03 | 17.86 | 19.19 | 20.08 | 22.43 |
| % Water abs. after soaking in water for 24 hours | 33.62 | 41.21 | 50.32 | 39.17 | 43.46 | 55.26 |
| Internal bonding, psi | 293 | 259 | 278 | 215 | 224 | 213 |

[1]Commercially available from Wilner Wood Products Co., Norway, Maine, under the designation "PINE DRI", understood as consisting of white pine wood (moisture content: 4.2-11%, particle size: 8-20 mesh).
[2]Obtained from Elmendorf Board Corporation, Claremont, New Hampshire, understood as consisting of 70% pine wood and 30% aspen wood (moisture content: 4.2-11%, particle size: strands ranging in length from about 1/4"-2 1/2").
[3](% NCO: 32.1, viscosity: 180 cps at 25° C.).

EXAMPLE 7

The procedure of Example 4 was repeated except that the wood chips [1] were sprayed with a solution containing 50% of crude TDI and 50% of an ester composition [2].

[1]Obtained from Elmendorf Board Corporation, Claremont, N.H., understood as consisting of 70% pine wood and 30% aspen wood (moisture content: 4.2%, particle size: strands ranging in length from about 1/4"-2 1/2").
[2]Commercially available from E. I. duPont de Nemours & Co. under the designation "DBE", understood as consisting of a mixture of dimethyl succinate, dimethyl glutarate and dimethyl adipate.

The particle board was demolded without demonstrably sticking to the caul plates. The physical appearance of the particle board was excellent. The composition and physical properties of the particle board are summarized in Table II below.

EXAMPLES 8-10

The procedure of Example 7 was repeated except with the following changes. In Example 8, the wood chips were sprayed with a solution containing 75% of crude TDI and 25% of an ester composition 1. Example 9, the solution of Example 7 was employed, and 0.18 grams of a common urethane catalyst 2 were also applied to the wood chips. In Example 10, the solution of Example 8 was employed, and 0.18 grams of the catalyst used in carrying out Example 9 were also applied to the wood chips. In Examples 9 and 10, the catalyst was sprayed on to the wood chips as part of a solution containing the catalyst and the ester used in the binder composition in a weight ratio of 25:75.

1 Commercially available from E. I. duPont de Nemours & Co. under the designation "DBE", understood as consisting of a mixture of dimethyl succinate, dimethyl glutarate and dimethyl adipate.
2 Commercially available from M&T Chemicals, Inc., Rahway, N.J., under the designation "T-45", understood as consisting of potassium octoate.

The particle boards were demolded without demonstrably sticking to the caul plates. The physical appearance of the particle boards was excellent. The composition and physical properties of the particle boards are summarized in Table II below.

TABLE II

| | Example | | | |
|---|---|---|---|---|
| | 7 | 8 | 9 | 10 |
| Wood chips[1], grams | 104.2 | 104.2 | 104.2 | 104.2 |
| Moisture content, percent | 4.2 | 4.2 | 4.2 | 4.2 |
| Binder composition[2], grams | 8.0 | — | 8.0 | — |
| Binder composition[3], grams | — | 8.0 | — | 8.0 |
| Catalyst[4] | — | — | 0.18 | 0.18 |
| Molding conditions: | | | | |
| Temperature, °F. | 300 | 300 | 300 | 300 |
| Pressure, psi | 700 | 700 | 700 | 700 |
| Time, minutes | 6 | 6 | 6 | 6 |
| % Wt. loss-during pressing | 4.69 | 4.11 | 4.51 | 4.19 |
| Physical Properties | | | | |
| Thickness, inches | 0.378 | 0.384 | 0.383 | 0.384 |
| Density, pcf | 46.15 | 43.93 | 45.56 | 45.19 |
| % Thickness swell after soaking in water for 24 hours | 37.43 | 28.94 | 34.08 | 26.79 |
| % Water abs. after soaking in water for 24 hours | 70.42 | 66.17 | 64.44 | 63.55 |
| Internal bonding, psi | 162.6 | 198.0 | 158.5 | 216.6 |

[1]Obtained from Elmendorf Board Corporation, Claremont, New Hampshire, understood as consisting of 70% pine wood and 30% aspen wood (moisture content: 4.2%, particle size: strands ranging in length from about 1/4"-2 1/2").
[2](% NCO: 18.1, viscosity: <100 cps at 25° C.).
[3](% NCO: 27.4, viscosity: <100 cps at 25° C.).
[4]Commercially available from M&T Chemicals, Inc., Rahway, New Jersey, under the designation "T-45", understood as consisting of potassium octoate.

EXAMPLES 11-13

Additional samples of particle board were prepared according to the procedure of Example 4. In carrying out the examples, solutions containing various esters were sprayed on the wood chips 1 in place of the solution used in Example 4. Also, the wood chips were employed in the amount of 104.5 grams and had a moisture content of 4.5%. Further, in each example, 6.0 grams of the binder composition were sprayed on the wood chips.

1 Obtained from Elmendorf Board Corporation, Claremont, N.H., understood as consisting of 70% pine wood and 30% aspen wood (moisture content: 4.5%, particle size: strands ranging in length from about 1/4"-2 1/2").

All the samples demolded without demonstrably sticking to the caul plates. The physical appearance of the samples was excellent. The composition and physical properties of the samples are summarized in Table III below.

TABLE III

| | Example | | |
|---|---|---|---|
| | 11 | 12 | 13 |
| Wood chips[1], grams | 104.5 | 104.5 | 104.5 |
| Moisture content, percent | 4.5 | 4.5 | 4.5 |
| Binder composition[2], grams | 6.0 | — | — |
| Binder composition[3], grams | — | 6.0 | — |
| Binder composition[4], grams | — | — | 6.0 |
| Molding conditions: | | | |
| Temperature, °F. | 300 | 300 | 300 |
| Pressure, psi | 700 | 700 | 700 |
| Time, minutes | 6 | 6 | 6 |
| % Wt. loss-during pressing | 1.83 | 2.38 | 2.19 |
| Physical Properties | | | |
| Thickness, inches | 0.448 | 0.451 | 0.448 |
| Density, pcf | 45.32 | 47.73 | 45.39 |
| % Thickness swell after soaking in water for 24 hours | 25.67 | 29.83 | 31.03 |
| Internal bonding, psi | 145 | 248 | 118 |

[1] Obtained from Elmendorf Board Corporation, Claremont, New Hampshire, understood as consisting of 70% pine wood and 30% aspen wood (moisture content: 4.5%, particle size: strands ranging in length from about ¼"–2½").
[2] Contained 70% of crude TDI and 30% of diethyl phthalate (% NCO: 23.88).
[3] Contained 70% of crude TDI and 30% of dibutyl maleate (% NCO: 23.88).
[4] Contained 70% of crude TDI and 30% of a dialkyl (C7-11) phthalate mixture, commercially available from Monsanto Company, St. Louis, Missouri, under the designation "Santicizer-711" (% NCO: 23.88).

EXAMPLES 14–16

The procedure of Example 1 was repeated except with the following changes. A different type of wood chips 1 was used, and in these examples, the wood chips were employed in varying proportions and containing varying moisture contents. Also, the wood chips were sprayed with 3.3 grams of a solution containing 90% of toluene diisocyanate 2 and 10% of an ester composition 3. Additionally, the molding pressure was also varied.

1 Obtained from Elmendorf Board Corporation, Claremont, N.H., understood as consisting of 70% pine wood and 30% aspen wood (moisture content: 4–12%, particle size: strands ranging in length from about ¼"–2½").
2 This is a mixture of toluene diisocyanate isomers (80:20 mixture of 2,4/2,6-isomers).
3 Commercially available from E. I. duPont de Nemours & Co. under the designation "DBE", understood as consisting of a mixture of dimethyl succinate, dimethyl glutarate and dimethyl adipate.

The particle boards were demolded without demonstrably sticking to the caul plates. The physical appearance of the particle boards was excellent. The composition and physical properties of the particle boards are summarized in Table IV below.

TABLE IV

| | Example | | |
|---|---|---|---|
| | 14 | 15 | 16 |
| Wood chips[1], grams | 104 | 108 | 112 |
| Moisture content, percent | 4 | 8 | 12 |
| Binder composition[2], grams | 3.3 | 3.3 | 3.3 |
| Molding conditions: | | | |
| Temperature, °F. | 300 | 300 | 300 |
| Pressure, psi | 640 | 530 | 420 |
| Time, minutes | 6 | 6 | 6 |
| % Wt. loss-during pressing | 3.06 | 5.65 | 7.74 |
| Physical Properties | | | |
| Thickness, inches | 0.384 | 0.381 | 0.379 |
| Density, pcf | 44.77 | 47.79 | 46.07 |
| % Thickness swell after soaking in water for 24 hours | 39.00 | 41.70 | 37.40 |
| Internal bonding, psi | 123 | 118 | 119 |

[1] Obtained from Elmendorf Board Corporation, Claremont, New Hampshire, understood as consisting of 70% pine wood and 30% aspen wood (moisture content: 4–12%, particle size: strands ranging in length from about ¼"–2½").
[2] (% NCO: 43.5, viscosity <30 cps at 25° C.).

EXAMPLES 17–19

The procedure of Example 1 was repeated except with the following changes. A different type of wood chips 1 was used. Also, the wood chips were sprayed with a solution containing 50% of an isocyanate 2 and 50% of an ester composition 3. Further, in Example 18, 12.0 grams, instead of 8.0 grams, of the solution were employed, and in Example 19, 0.75 grams of a common urethane catalyst 4 were also applied to the wood chips. The catalyst was sprayed on to the wood chips as part of a solution containing the catalyst and the ester used in the binder composition in a weight ratio of 25:75.

1 Obtained from Elmendorf Board Corporation, Claremont, N.H., understood as consisting of 70% pine wood and 30% aspen wood (moisture content: 4.2%, particle size: strands ranging in length from about ¼"–2½"). ≠ 2 Commerially available polymeric polyisocyanate from Upjohn Chemical Company, Kalamazoo, Mich., under the designation "PAPI-135". ≠ 3 Commercially available from E. I. duPont de Nemours & Co. under the designation "DBE", understood as consisting of a mixture of dimethyl succinate, dimethyl glutarate and dimethyl adipate.
4 Commercially available from Aldrich Chemical Company, Inc., Milwaukee, Wis., understood as consisting of triethylamine.

The particle boards were demolded without demonstrably sticking to the caul plates. The physical appearance of the particle boards was excellent. The composition and physical properties of the particle boards are summarized in Table V below.

TABLE V

| | Example | | |
|---|---|---|---|
| | 17 | 18 | 19 |
| Wood chips[1], grams | 104.2 | 104.2 | 104.2 |
| Moisture content, percent | 4.2 | 4.2 | 4.2 |
| Binder composition[2], grams | 8.0 | 12.0 | 8.0 |
| Catalyst[3] | — | — | 0.75 |
| Molding conditions: | | | |
| Temperature, °F. | 300 | 300 | 300 |
| Pressure, psi | 700 | 700 | 700 |
| Time, minutes | 6 | 6 | 6 |
| % Wt. loss-during pressing | 4.47 | 4.26 | 4.34 |
| Physical Properties | | | |
| Thickness, inches | 0.381 | 0.383 | 0.399 |
| Density, pcf | 45.0 | 44.64 | 42.38 |
| % Thickness swell after soaking in water for 24 hours | 31.00 | 23.08 | 38.48 |
| Internal bonding, psi | 128 | 193 | 106 |

[1] Obtained from Elmendorf Board Corporation, Claremont, New Hampshire, understood as consisting of 70% pine wood and 30% aspen wood (moisture content: 4.2%, particle size: strands ranging in length from about ¼"–2½").
[2] (% NCO: 15.56).
[3] Commercially available from Aldrich Chemical Company, Inc., Milwaukee, Wisconsin, understood as consisting of triethylamine.

What is claimed is:

1. A liquid binder composition comprising a mixture of from about 40 to about 98 percent by weight of an organic polyisocyanate and correspondingly from about 2 to about 60 percent by weight of an ester derived from a dicarboxylic acid, said ester being selected from the group consisting of
   (a) saturated aliphatic dicarboxylic esters having the formula

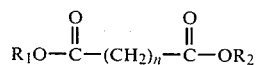

wherein $R_1$ and $R_2$ are independently selected from the group consisting of $C_1$–$C_{20}$ alkyl, $C_1$–$C_{20}$ haloalkyl and $C_1$–$C_{20}$ alkoxy and n is an integer ranging from 1–12, inclusive;

(b) unsaturated aliphatic dicarboxylic esters having the formula

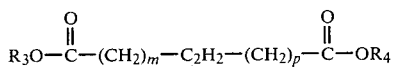

wherein $R_3$ and $R_4$ are independently selected from the group consisting of $C_1$–$C_{20}$ alkyl, $C_1$–$C_{20}$ haloalkyl and $C_1$–$C_{20}$ alkoxy and m and p are the same and each is an integer ranging from 1–10, inclusive;

(c) aromatic dicarboxylic esters having the formula

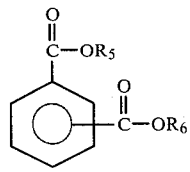

wherein $R_5$ and $R_6$ are independently selected from the group consisting of $C_1$–$C_{10}$ alkyl, $C_1$–$C_{10}$ haloalkyl and $C_1$–$C_{10}$ alkoxy and wherein the aromatic ring is otherwise unsubstituted or substituted with at least one member selected from the group consisting of halo and $C_1$–$C_4$ alkyl; and (d) mixtures threof.

2. The composition of claim 1, wherein said ester is selected from the group consisting of (a) saturated aliphatic dicarboxylic esters, wherein $R_1$ and $R_2$ are independently selected from the group consisting of $C_1$–$C_8$ alkyl, $C_1$–$C_8$ haloalkyl and $C_1$–$C_8$ alkoxy and n is an integer ranging from 1–8, inclusive;

(b) unsaturated aliphatic dicarboxylic esters, wherein $R_3$ and $R_4$ are independently selected from the group consisting of $C_1$–$C_8$ alkyl, $C_1$–$C_8$ haloalkyl and $C_1$–$C_8$ alkoxy and m and p are the same and each is an integer ranging from 1–3, inclusive;

(c) aromatic dicarboxylic esters, wherein $R_5$ and $R_6$ are independently selected from the group consisting of $C_1$–$C_4$ alkyl, $C_1$–$C_4$ haloalkyl and $C_1$–$C_4$ alkoxy and wherein the aromatic ring is otherwise unsubstituted; and (d) mixtures thereof.

3. The composition of claim 2, wherein said ester is derived from a dicarboxylic acid selected from the group consisting of oxalic, malonic, succinic, glutaric, adipic, pimelic, suberic, azelaic, sebacic, maleic, fumaric, phthalic, isophthalic and terephthalic.

4. The composition of claim 3, wherein said ester is derived from a dicarboxylic acid selected from the group consisting of succinic, glutaric and adipic.

5. The composition of claim 1, wherein said organic polyisocyanate is selected from the group consisting of toluene diisocyanate, polyphenylene polymethylene isocyanate and mixtures thereof.

6. The composition of claim 5, wherein said organic polyisocyanate is a crude product of the phosgenation of toluene diamine.

7. The composition of claim 1, wherein there is employed in said mixture from about 70 to about 97 percent by weight of said organic polyisocyanate and correspondingly from about 3 to about 30 percent by weight of said ester.

8. The composition of claim 7, wherein said organic polyisocyanate is a crude product of the phosgenation of toluene diamine and said ester is derived from a dicarboxylic acid selected from the group consisting of oxalic, malonic, succinic, glutaric, adipic, pimelic, suberic, azelaic, sebacic, maleic, fumaric, phthalic, isophthalic and terephthalic.

9. The composition of claim 8, wherein said crude product is prepared by:

(a) mixing toluene diamine with an inert organic diluent and a stoichiometric excess of phosgene;

(b) heating the mixture to about 100°–200° C. in order to bring about the phosgenation of said toluene diamine to toluene diisocyanate, with the concurrent formation of hydrogen chloride as a by-product;

(c) removing substantially all of the diluent, the unreacted phosgene and the hydrogen chloride by-product;

(d) optionally removing, by distillation, a portion of the toluene diisocyanate in the phosgenation product and recovering, as a residual distilland, said crude phosgenation product; and (e) removing any precipitated or suspended solids that may be present in said crude phosgenation product.

10. The composition of claim 9, wherein said ester is derived from a dicarboxylic acid selected from the group consisting of succinic, glutaric and adipic.

11. A process for the preparation of a lignocellulosic composite material, comprising the steps of: contacting a plurality of lignocellulosic particles with a liquid binder composition; and then forming said contacted particles into a composite material by the application of heat and pressure, said liquid binder composition comprising a mixture of from about 40 to about 98 percent by weight of an organic polyisocyanate and correspondingly from about 2 to about 60 percent by weight of an ester derived from a dicarboxylic acid, said ester being selected from the group consisting of (a) saturated aliphatic dicarboxilic esters having the formula

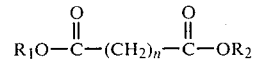

wherein $R_1$ and $R_2$ are independently selected from the group consisting of $C_1$–$C_{20}$ alkyl, $C_1$–$C_{20}$ haloalkyl and $C_1$–$C_{20}$ alkoxy and n is an integer ranging from 1–12, inclusive;

(b) unsaturated aliphatic dicarboxylic esters having the formula

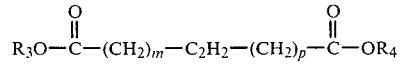

wherein $R_3$ and $R_4$ are independently selected from the group consisting of $C_1$–$C_{20}$ alkyl, $C_1$–$C_{20}$ haloalkyl and $C_1$–$C_{20}$ alkoxy and m and p are the same and each is an integer ranging from 1–10, inclusive;

(c) aromatic dicarboxic esters having the formula

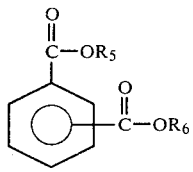

wherein $R_5$ and $R_6$ are independently selected from the group consisting of $C_1$-$C_{10}$ alkyl, $C_1$-$C_{10}$ haloalkyl and $C_1$-$C_{10}$ alkoxy and wherein the aromatic ring is otherwise unsubstituted or substituted with at least one member selected from the group consisting of halo and $C_1$-$C_4$ alkyl; and (d) mixtures thereof.

12. The process of claim 11, wherein there is employed from about 2 to about 50 percent by weight, based on the dry weight of said lignocellulosic particles, of said binder composition.

13. The process of claim 12, wherein there is employed from about 3 to about 20 percent by weight, based on the dry weight of said lignocellulosic particles, of said binder composition.

14. The process of claim 11, wherein said ester is selected from the group consisting of (a) saturated aliphatic dicarboxylic esters, wherein $R_1$ and $R_2$ are independently selected from the group consisting of $C_1$-$C_8$ alkyl, $C_1$-$C_8$ haloalkyl and $C_1$-$C_8$ alkoxy and n is an integer ranging from 1-8, inclusive;

(b) unsaturated aliphatic dicarboxylic esters, wherein $R_3$ and $R_4$ are independently selected from the group consisting of $C_1$-$C_8$ alkyl, $C_1$-$C_8$ haloalkyl and $C_1$-$C_8$ alkoxy and m and p are the same and each is an integer ranging from 1—3, inclusive;

(c) aromatic dicarboxylic esters, wherein $R_5$ and $R_6$ are independently selected from the group consisting of $C_1$-$C_4$ alkyl, $C_1$-$C_4$ haloalkyl and $C_1$-$C_4$ alkoxy and wherein the aromatic ring is otherwise unsubstituted; and (d) mixtures thereof.

15. The process of claim 14, wherein said ester is derived from a dicarboxylic acid selected from the group consisting of oxalic, malonic, succinic, glutaric, adipic, pimelic, suberic, azelaic, sebacic, maleic, fumaric, phthalic, isophthalic and terephthalic.

16. The process of claim 15, wherein said ester is derived from a dicarboxylic acid selected from the group consisting of succinic, glutaric and adipic.

17. The process of claim 11, wherein said organic polyisocyanate is selected from the group consisting of toluene diisocyanate, polyphenylene polymethylene isocyanate and mixtures thereof.

18. The process of claim 17, wherein said organic polyisocyanate is a crude product of the phosgenation of toluene diamine.

19. The process of claim 11, wherein there is employed in said mixture from about 70 to about 97 percent by weight of said organic polyisocyanate and correspondingly from about 3 to about 30 percent by weight of said ester.

20. The process of claim 19, wherein said organic polyisocyanate is a crude product of the phosgenation of toluene diamine and said ester is derived from a dicarboxylic acid selected from the group consisting of oxalic, malonic, succinic, glutaric, adipic, pimelic, suberic, azelaic, sebacic, maleic, fumaric, phthalic, isophthalic and terephthalic.

21. The process of claim 20, wherein there is employed from about 3 to about 20 percent by weight, based on the dry weight of said lignocellulosic particles, of said binder composition.

22. The process of claim 21, wherein said crude product is prepared by:

(a) mixing toluene diamine with an inert organic diluent and a stoichiometric excess of phosgene;

(b) heating the mixture to about 100°-200° C. in order to bring about the phosgenation of said toluene diamine to toluene diisocyanate, with the concurrent formation of hydrogen chloride as a by-product;

(c) removing substantially all of the diluent, the unreacted phosgene and the hydrogen chloride by-product;

(d) optionally removing, by distillation, a portion of the toluene diisocyanate in the phosgenation product and recovering, as a residual distilland, said crude phosgenation product; and (e) removing any precipitated or suspended solids that may be present in said crude phosgenation product.

23. The process of claim 22, wherein said ester is derived from a dicarboxylic acid selected from the group consisting of succinic, glutaric and adipic.

24. The process of claim 23, wherein said lignocellulosic particles are wood chips and said lignocellulosic composite material is wood particle board.

25. A lignocellulosic composite material prepared according to the process of claim 11.

26. A lignocellulosic composite material prepared according to the process of claim 16.

27. A lignocellulosic composite material prepared according to the process of claim 18.

28. A lignocellulosic composite material prepared according to the process of claim 20.

29. A lignocellulosic composite material prepared according to the process of claim 22.

30. A lignocellulosic composite material prepared according to the process of claim 23.

31. A lignocellulosic composite material prepared according to the process of claim 24.

* * * * *

UNITED STATES PATENT AND TRADEMARK OFFICE
CERTIFICATE OF CORRECTION

PATENT NO. : 4,490,518

DATED : December 25, 1984

INVENTOR(S) : Stephen Fuzesi and Robert W. Brown

It is certified that error appears in the above-identified patent and that said Letters Patent is hereby corrected as shown below:

Column 7, line 44, before "Example" insert --In--;

Column 10, line 5, delete "'(apostrophe)" and insert --1--;

Column 10, lines 17 and 19, delete "$\neq$";

Column 11, line 27, delete "threof" and insert --thereof--;

Column 12, line 68, delete "dicarboxic" and insert --dicarboxylic--.

Signed and Sealed this

Eighth Day of October 1985

[SEAL]

Attest:

DONALD J. QUIGG

Attesting Officer

Commissioner of Patents and Trademarks—Designate